J. Strayer.
Seed Dropper.
No. 1,666. Reissued May 10, 1864.
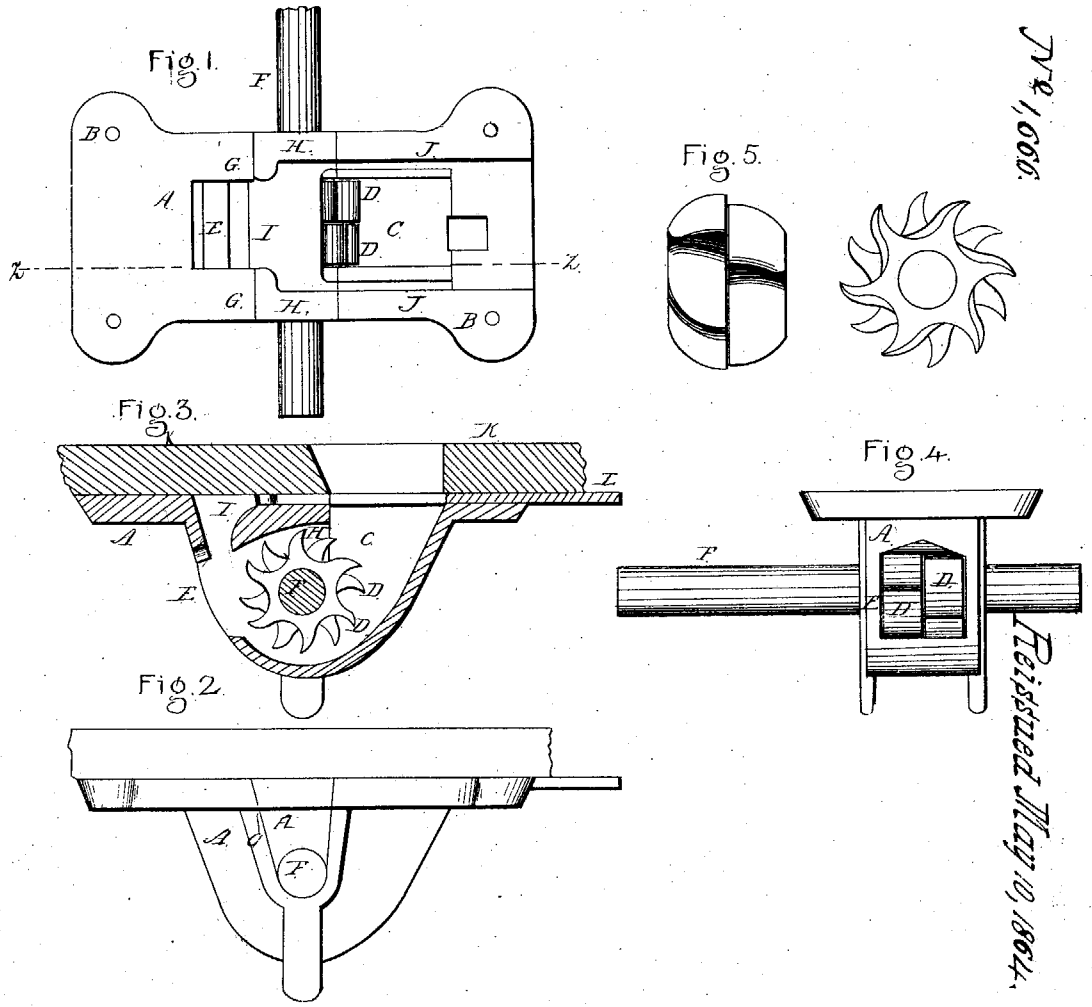
Witnesses:
R. M. Sherman
J. E. Dennis.
Inventor:
Jacob Strayer
By his Attorney
S. Dennis Jr.
N. PETERS, PHOTO-LITHOGRAPHER, WASHINGTON, D. C.

UNITED STATES PATENT OFFICE.

JACOB STRAYER, OF SOUTH BEND, INDIANA.

IMPROVEMENT IN SEED-DRILLS.

Specification forming part of Letters Patent No. 32,319, dated May 14, 1861; Reissue No. 1,666, dated May 10, 1864.

*To all whom it may concern:*

Be it known that I, JACOB STRAYER, of South Bend, in the county of St. Joseph and State of Indiana, have invented new and useful Improvements in Seed-Drills; and I do hereby declare that the following is a full, clear, and exact description thereof, reference being had to the accompanying drawings, and to the letters of reference marked thereon.

In my grain-drill I employ a peculiar kind of feed-roller, having short teeth extending only part of the length of the roller. It is very difficult, if not wholly impracticable, to cast such a roller in one piece, because the sand forming the mold cannot be kept in place during the separation of the mold for the removal of the pattern and until the iron is poured in. The principal object of my invention is to obviate this difficulty.

My invention consists in casting the feed-rollers of grain-drills in transverse sections for the purpose of more perfectly casting the teeth when the latter extend only part of the length of the roller.

In the accompanying drawings, Figure 1 is a top view of the feed-roller and box containing the same. Fig. 2 is a side elevation of the same. Fig. 3 is a vertical section on the line *z z*, Fig. 1. Fig. 4 represents an end view. Fig. 5 is a view of a spheroidal roller. Fig. 6 is a straight roller.

In manufacturing grain-drills I usually employ a feed-roller of uniform size from end to end and provided with teeth extending half the length of the roller, as shown in Figs. 1, 4, and 6 of the accompanying drawings; but the general shape of the roller may be spheroidal, with spiral teeth, as seen in Fig. 5, in order to run the grain toward the center when delivered.

In casting my feed-rollers I make two patterns of suitable form for casting the feed-roller in two sections, D D, Figs. 1, 3, and 4. These two patterns are employed for molding the sand in the usual manner. By casting the roller in sections the sand does not break down at the corners or angles of the mold upon opening the mold to remove the pattern or upon pouring in the molten iron. The two sections D D are cast so as to fit upon shaft F, as seen in Figs. 3 and 4, thus forming the complete roller. When the two sections are thus placed together on the shaft F the teeth of one section are opposite the spaces between the teeth in the other section, as seen in the drawings. The feed-roller is inclosed in a box, A, Fig. 3, the shaft F having bearing G in the box and being set in motion by the traveling wheel of the drill in the usual manner. This box A is attached to the bottom board, K, Fig. 3, of the seed-box by screws placed at holes B, Fig. 1, or in any other suitable manner. The grain enters the box A through the opening C, and is then carried along the teeth D of the revolving feed-roller and discharged at E, Fig. 3, as indicated by the arrow. The roller having two sets of teeth D, with toothless spaces opposite all the teeth, discharges the grain or seed more uniformly, and not in bunches, as in the case with rollers having teeth along the whole length of said rollers.

Having thus fully described my invention, what I claim, and desire to secure by Letters Patent of the United States, is—

Making the feed-roller in two or more sections, substantially in the manner and for the purposes described.

JACOB STRAYER.

Witnesses:
A. S. DUNBAR,
W. SAUNDERS.